United States Patent [19]

Kusumoto

[11] Patent Number: 5,427,373
[45] Date of Patent: Jun. 27, 1995

[54] SHAFT FOR GOLF CLUB
[75] Inventor: Harunobu Kusumoto, Tokyo, Japan
[73] Assignee: Daiwa Golf Co., Ltd., Tokyo, Japan
[21] Appl. No.: 80,187
[22] Filed: Jun. 23, 1993
[30] Foreign Application Priority Data

| Jun. 24, 1992 | [JP] | Japan | 4-043892 U |
| Jul. 2, 1992 | [JP] | Japan | 4-046175 U |
| Jul. 7, 1992 | [JP] | Japan | 4-047359 U |
| Jul. 7, 1992 | [JP] | Japan | 4-179804 |

[51] Int. Cl.$^6$ ............................................. A63B 53/10
[52] U.S. Cl. .................. 273/80 R; 273/80 B; 273/DIG. 23
[58] Field of Search ............. 273/80 R, 80 B, DIG. 7, 273/DIG. 23, 73 F; 156/187, 188, 189, 190, 173; 43/18.1, 18.5; 138/129, 137, DIG. 2; 428/36.3, 36.91, 34.6, 246, 113

[56] References Cited

U.S. PATENT DOCUMENTS

| 3,313,541 | 4/1967 | Benkoczy | 273/80 R |
| 4,000,896 | 1/1977 | Lauraitis | 273/DIG. 23 |
| 4,082,277 | 4/1978 | van Auken | 273/80 R |
| 4,097,626 | 6/1978 | Tennent | 273/80 R |
| 4,135,035 | 1/1979 | Branen | 273/80 R |
| 4,319,750 | 3/1982 | Roy | 273/80 B |
| 5,028,464 | 7/1991 | Shigetoh | 273/80 R |
| 5,049,422 | 9/1991 | Honma | 273/80 R |
| 5,088,735 | 2/1992 | Shigetoh | 273/80 B |
| 5,093,162 | 3/1992 | Fenton | 273/80 R |
| 5,143,374 | 9/1992 | Shibasaki | 273/DIG. 7 |
| 5,156,396 | 10/1992 | Akatsuka | 273/80 B |
| 5,158,289 | 10/1992 | Okumoto | 273/80 R |

FOREIGN PATENT DOCUMENTS

| 53-30359 | 7/1978 | Japan . |
| 55-131275 | 9/1980 | Japan . |
| 60-31743 | 9/1985 | Japan . |
| 61-6939 | 3/1986 | Japan . |
| 3-41728 | 9/1991 | Japan . |

Primary Examiner—Sebastiano Passaniti
Attorney, Agent, or Firm—Longacre & White

[57] ABSTRACT

A shaft for a golf club includes a tubular main body made of a fiber-reinforced resin and being 10 mm or less in the outside diameter of the tip of the body. The outside circumferential surface of the main body is tapered from the butt thereof to the tip thereof at a ratio of 0/1,000 to 4/1,000 so as to be nearly uniform in diameter. The thickness of the main body is gradually increased from the tip thereof to the butt thereof. The golf club having the shaft, receives a low resistance of air, and has a rigidity appropriate for a powerful golfer who swings the club quickly.

21 Claims, 15 Drawing Sheets

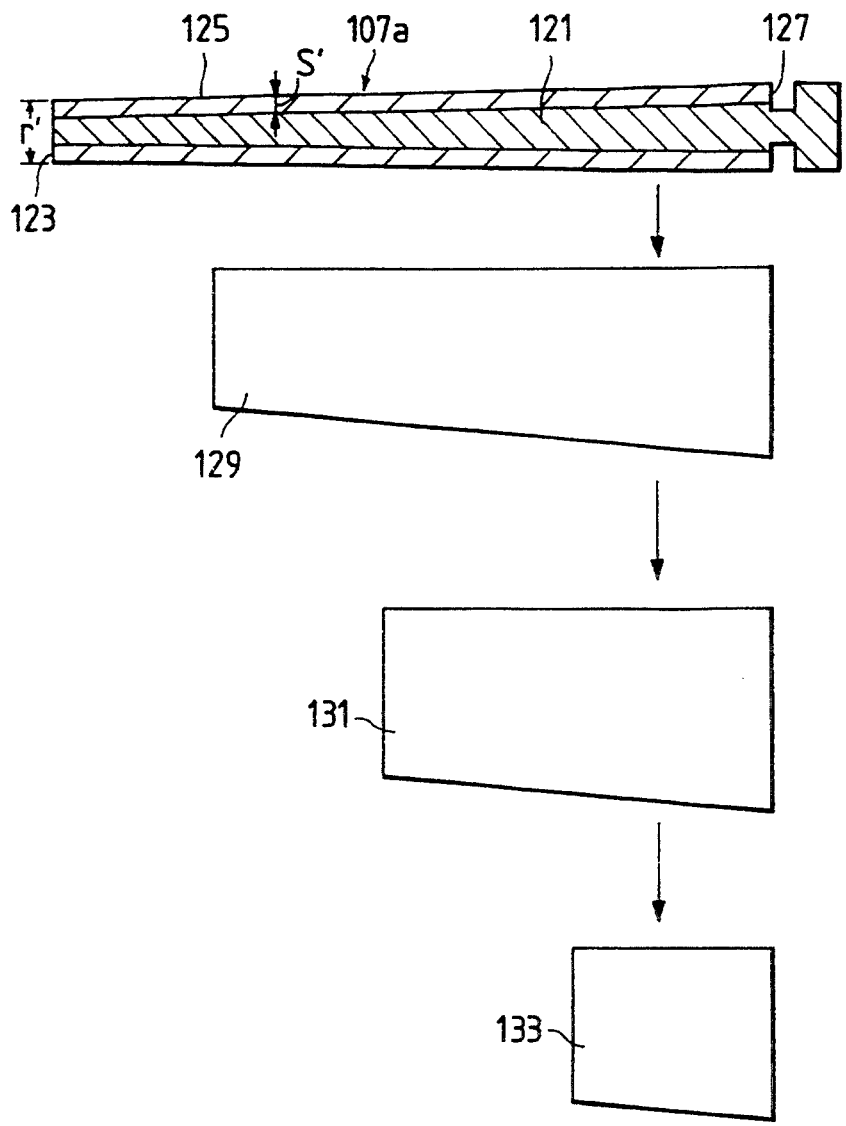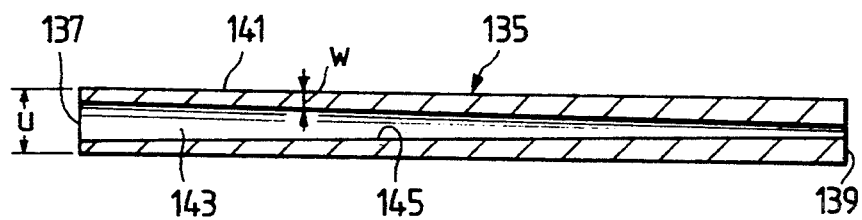

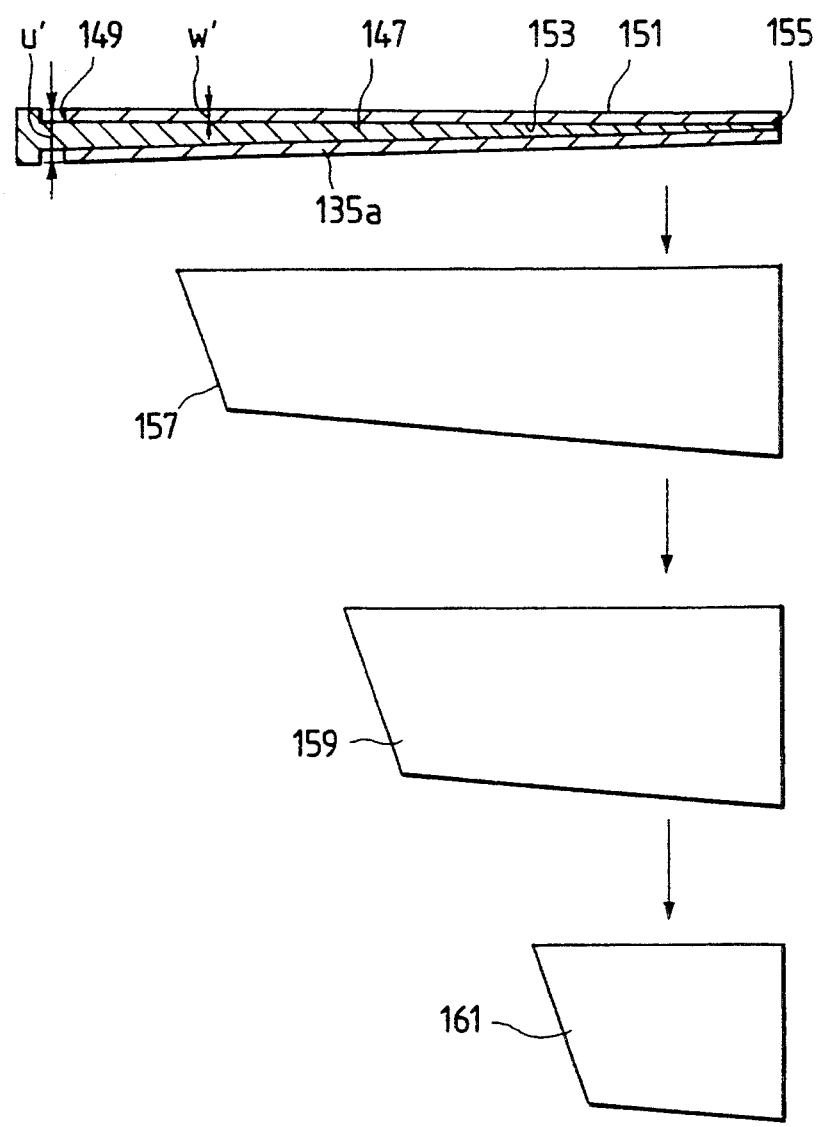

SHAFT FOR GOLF CLUB

BACKGROUND OF THE INVENTION

The present invention relates to a shaft for a golf club.

A golf club including a shaft made of a fiber-reinforced resin has recently been developed as disclosed in the Japan Utility Model Application No. 30359/78 etc. The outside diameter of the tip of the shaft is about 7 to 10 mm, or about 7 to 9 mm for a wood and about 8 to 10 mm for an iron. Since the thickness t of the main body 1 of the shaft is gradually deceased from the tip 3 of the body to the butt 5 thereof, the outside circumferential surface of the main body is tapered from the butt thereof to the tip thereof in order to increase the rigidity of the body toward the butt thereof, as shown in FIG. 22. The grip of the shaft is conjoined to the main body 1 at the butt 5 thereof. Since the tapering of the outside circumferential surface of the main body 1, which results in increasing the outside diameter thereof toward the butt thereof, is so large that the ratio of the decrease in the outside diameter to the length of the body is 6/1,000 or more, the resistance of air to the body at the time of swinging of the golf club is increased to slow down the swinging speed. This is a problem.

To solve the problem, a golf club shaft whose main body is tapered from the butt thereof to the tip thereof at a ratio of 0/1,000 to 4/1,000 so as to be nearly uniform in outside diameter has been proposed as disclosed in the Japan Utility Model Application No. 31743/85. Since the main body is nearly equal in the outside diameter of the tip to the main body of the former shaft, the latter shaft is higher in flexibility than the former shaft. Since the main body of the latter shaft is smaller in diameter as a whole than that of the former shaft, the resistance of air to the main body of the latter shaft is lower than that to the main body of the former shaft to make it possible to speed up the swinging of the golf club having the latter shaft. For that reason, even non-powerful golfers such as beginners and women can more quickly swing the golf club to move the head thereof faster to hit a ball to a larger distance. However, powerful golfers, who swing their golf clubs quickly, want such a golf club of lower air resistance more than the non-powerful golfers, and the magnitude of air resistance affects the powerful golfers more than the non-powerful golfers. Nonetheless, the golf club of lower air resistance is too high in flexibility or too low in rigidity for the powerful golfers. In other words, a golf club low enough in air resistance and high enough in rigidity for the powerful golfers has not existed.

Technic for winding a sheet material on a shaft main body to provide a reinforcing layer on the main body has been proposed.

The main body 17 of the shaft of a golf club disclosed in the Japan Utility Model Application (OPI) No. 131275/80 (the term "OPI" as used herein means an "unexamined published application") is manufactured by winding a plurality of fiber-reinforced resin sheets 11, 13 and 15 around a mandrel 27, and then winding fiber-reinforced resin sheets 19 and 21 around the former sheets so that the latter sheets constitute reinforcing layers 23 and 25, as shown in FIGS. 23 and 24, to partially heighten the rigidity of the main body to modulate the kick point of the shaft. However, since the reinforcing sheet 21 differs in strength from the former sheets 11, 13 and 15, the elongation of the reinforcing sheet and that of the former sheet 15, which are caused when the main body 17 flexes during the swinging of the golf club, differ from each other to make the sheets likely to separate from each other, as shown in FIG. 25. Besides, since the sheet-reinforced portion and sheet-unreinforced portion of the sheet 15 adjoin each other at the riser 29 of the reinforcing sheet 21, stress concentrates in the former sheet at the riser at the time of the flexing of the main body 17 to make the former sheet likely to undergo a crack 31 extending in the radial direction of the body, as shown in FIG. 26.

The main body of the shaft of a golf club disclosed in the Japan Utility Model Application No. 41728/91 is manufactured by winding a plurality of prepreg sheets each composed of high-strength fibers such as carbon fibers and fiberglass and a matrix of epoxy resin, polyester or the like, which is impregnated in the fibers. At the time of the manufacturing, each of the sheets is wound by one turn so as not to overlap the side edges of the sheet with each other but to butt the edges to each other, or each sheet 41 is wound by two turns so as to butt one side edge 41b of the sheet to a riser 45 formed by the sheet because of the overlapping of the other side edge 41a and other portion thereof, as shown in FIG. 27. The main body is slightly lower in strength at the buttings of the sheets than at the other portions thereof. As a result, if the buttings are located on an imaginary straight line extending along the axis of the main body, the rigidity thereof varies along the circumference thereof.

Since the main body of the shaft of a golf club is made of sheets wound so that the side edges of each of them are not butted to each other but overlapped with each other, the thickness of the layer constituted by the sheet is larger at the overlapping thereof than at the other portion thereof so that the rigidity of the main body varies along the circumference thereof.

For these reasons, the head of each of the last two golf clubs deflects at the time of swinging of the club so that a ball cannot precisely be hit therewith.

SUMMARY OF THE INVENTION

The present invention was made in order to solve the problems described above.

Accordingly, it is an object of the invention to provide a shaft which is for a golf club, receives a lower resistance of air, and has a rigidity appropriate for a powerful golfer who swings the club quickly. The shaft includes a tubular main body made of a fiber-reinforced resin and being 10 mm or less in the outside diameter of the tip of the body. The outside circumferential surface of the main body is tapered from the butt thereof to the tip thereof at a ratio of 0/1,000 to 4/1,000 so as to be nearly uniform in diameter. The thickness of the main body is gradually increased from the tip thereof to the butt thereof. The resistance of air to the main body at the time of swinging of the golf club is lower than that to the main body of the shaft of a conventional golf club to make it possible to speed up the swinging. Since the main body is not only smaller in outside diameter than that of the conventional golf club but also gradually increased in thickness from the tip of the body to the butt thereof to heighten the rigidity of the body toward the butt thereof, the powerful golfer can swing the club quickly.

It is another object of the invention to provide a shaft which is for a golf club, receives a lower resistance of air, and has a rigidity appropriate for a powerful golfer who swings the club quickly. The shaft includes a tubular main body made of a fiber-reinforced resin and being 10 mm or less in the outside diameter of the tip of the body. The outside circumferential surface of the main body is tapered from the butt thereof to the tip thereof at a ratio of 0/1,000 to 4/1,000. The body has reinforcing layers whose moduli of elasticity sequentially increase toward the butt of the body. Since the outside circumferential surface of the main body is tapered so as to be nearly uniform in diameter and smaller in diameter than that of the main body of the shaft of a conventional golf club, the resistance of air to the former body at the time of swinging of the club is lower than that to the latter body to make it possible to speed up the swinging. Since the former main body is not only smaller in outside diameter than the latter main body but also heightened in rigidity by providing the reinforcing layers whose moduli of elasticity sequentially increase toward the butt of the body, the powerful golfer can swing the club quickly.

It is yet another object of the invention to provide a shaft which is for a golf club and in which reinforcing layers constituted by reinforcing sheets wound at a portion of the body are prevented from being separated from the portion, and stress is prevented from concentrating in the portion. Each of the reinforcing sheets is made of a fiber-reinforced resin and wound at the portion made of a fiber-reinforced resin. The risers of the reinforcing sheets wound at the portion are covered with a fiber-reinforced resin layer lower in modulus of elasticity than the reinforcing sheets, so that the layer prevents the reinforcing layers from being separated from the portion, reinforce the latter layers at the risers likely to undergo stress concentration, and prevents the main body from being sharply bent to be damaged.

It is yet another object of the invention to provide a shaft which is for a golf club and includes a main body whose rigidity is nearly uniform along the circumference of the body to prevent the head of the club from deflecting when the club is swung. The main body is made of a plurality of fiber-reinforced resin sheets, each of which is wound by one turn so as not to overlap both the side edges of the sheet with each other but to butt the edges to each other, or is wound by a plurality of turns so as not to overlap one side edge of the sheet with a riser formed by the sheet because of the overlapping of the other side edge and other portion thereof, but to butt the former side edge to the riser. Since the buttings of the sheets are nearly uniformly distributed along the circumference of the body, the rigidity thereof is uniform along the circumference. For that reason, the head conjoined to the main body at the tip thereof is prevented from deflecting when the club is swung.

DESCRIPTION OF THE DRAWINGS

In the accompanying drawings:

FIG. 3 is a view to illustrate a method of manufacturing the shaft;

FIG. 4 is a longitudinally sectional view of a shaft which is for a golf club and is another embodiment of the invention;

FIG. 5 is a view to illustrate a method of manufacturing the shaft shown in FIG. 4;

DETAILED DESCRIPTION OF EXEMPLARY EMBODIMENTS

Embodiments of the present invention are hereafter described in detail with reference to the drawings attached hereto.

Figure 1:
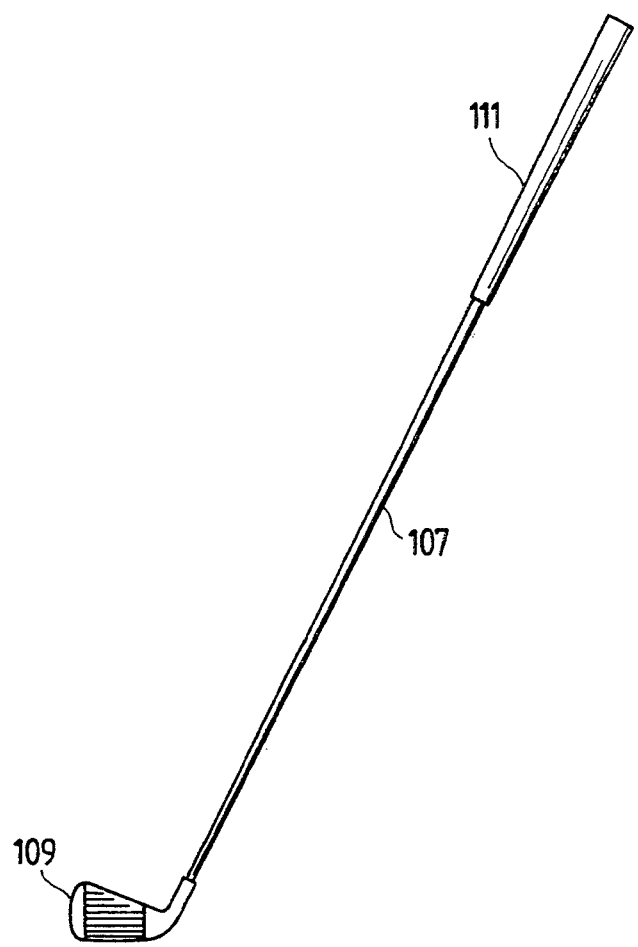
FIG. 1 is a front view of a golf club including a shaft which is an embodiment of the present invention.

FIG. 1 shows a golf club including a head 109 and a shaft which is one of the embodiments. The shaft includes a tubular main body 107, and a grip 111 conjoined thereto at the butt thereof. The head 109 is conjoined to the main body 107 at the tip thereof. The main body 107 is made of a resin and high-strength fibers which are carbon fibers, fiberglass or the like and reinforce the resin. The main body 107 is nearly uniform in outside diameter from the tip thereof to the butt thereof. It is preferable that the outside circumferential surface of the main body 107 is tapered from the butt 115 thereof to the tip 113 thereof at a ratio of 0/1,000 to 4/1,000 so that the outside diameter of the main body 107 is gradually decreased from the butt 115 thereof to the tip 113 thereof, the ratio being the reduction of the diameter of the body relative to the longitudinal length thereof.

Figure 2:
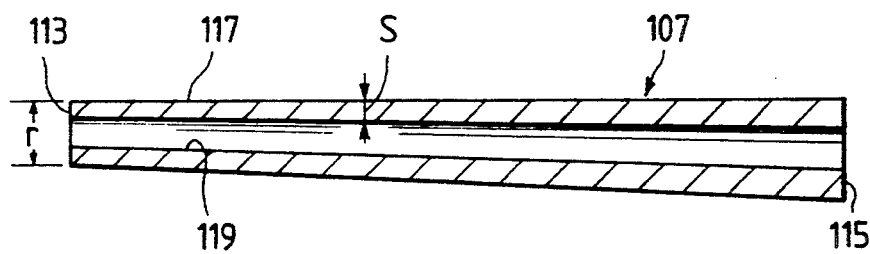
FIG. 2 is a longitudinally sectional view of the shaft.

FIG. 2 shows a longitudinal section of the main body 107. The outside diameter r of the tip 113 of the main body is about 8 mm. The outside circumferential surface 117 of the main body is tapered from the butt 115 thereof to the 113 thereof at a ratio of about 3/1,000 so that the surface is nearly uniform in diameter. The main body 107 is smaller in outside diameter than that of the shaft of a conventional golf club so that the resistance of air to the former body is lower than that to the latter body. To make the rigidity of the main body 107 high enough at and near the butt 115 thereof, the inside circumferential surface 119 of the body is tapered from the butt thereof to the tip 113 thereof at a ratio of about 2/1,000 so that the thickness s of the body gradually increases from the tip to the butt.

The main body 107 is manufactured as described with reference to FIG. 3 from now on. A fiber-reinforced resin sheet is first wound by a plurality of turns on the outside circumferential surface of a mandrel 121 along nearly the total length thereof. The surface of the mandrel 121 is tapered at a ratio of about 2/1,000. The main tube 107a of the main body 107 is thus made of the sheet. The main tube 107a is about 8 mm in the outside r' of the tip 123 thereof and nearly uniform in thickness s' from the butt 127 thereof to the tip, and has an outside circumferential surface 125 tapered from the butt to the tip at a ratio of about 2/1,000. Each of auxiliary fiber-reinforced resin sheets 129, 131 and 133 whose lengths sequentially decrease in that order as shown in FIG. 3 is then sequentially wound by a plurality of turns around the outside circumferential surface of the main tube 107a except at and near the tip 123 thereof so that the sheets of the largest, intermediate and smallest lengths constitute an inner, an intermediate and an outer layers around the tube, respectively, and one end of each sheet is coincident with the butt 127 of the tube. A tightening tape not shown in the drawings is then wound around the tube 107a and the sheets 129, 131 and 133 to tighten them together. The tube and the sheets are subjected to a thermosetting treatment. After that, the mandrel 121 is removed from the assembly of the tube and the sheets, and the tightening tape is peeled therefrom. The main body 107 is thus manufactured. By this manufacturing process, a large number of reinforcing sheets can be easily wound and integrated with each other to form the main body.

The moduli of elasticity of the auxiliary sheets 129, 131 and 133 are sequentially increased in that order reversely to the lengths thereof so that the rigidity of the main body 107 is modulated toward the butt thereof.

Since the main body 107 of the shaft of the golf club is smaller in outside diameter than that of the shaft of the conventional golf club and nearly uniform in outside diameter, the resistance of air to the former body at the time of swinging of the club is lower than that to the latter body to make it possible to speed up the swinging. Besides, the thickness s of the main body 107 is gradually increased from the tip 113 thereof to the butt 115 thereof to heighten the rigidity of the body toward the butt thereof. The club including the shaft having the main body 107 is thus made low enough in air resistance and high enough in rigidity for a powerful golfer to swing the club quickly.

FIG. 4 shows a longitudinal section of the tubular main body 135 of the shaft of a golf club, which is another of the embodiments. The main body 135 is made of a resin and high-strength fibers reinforcing the resin. The outside diameter u of the tip 137 of the body is about 9 mm. The outside circumferential surface 141 of the main body is tapered from the butt 139 thereof to the tip 137 thereof at a ratio of about 0/1,000 so that the surface is uniform in diameter. The inside circumferential surface 145 of the main body is tapered from the tip thereof to the butt thereof so that the diameter of the internal opening 143 of the body gradually decreases from the tip to the butt, and the thickness w of the body gradually increases from the tip to the butt.

The main body 135 is manufactured as described with reference to FIG. 5 from now on. A fiber-reinforced resin sheet is wound by a plurality of turns on the tapered outside circumferential surface of a mandrel 147 along nearly the total length thereof so that the sheet constitutes the main tube 135a of the body 135. The outside diameter u' of the butt 149 of the main tube 135a is about 9 mm. The outside and inside circumferential surfaces 151 and 153 of the tube 135a are tapered from the butt 149 thereof to the tip 155 thereof at the same ratio as the outside circumferential surface of the mandrel 147. The thickness w' of the tube 135a is uniform from the butt 149 thereof to the tip 155 thereof. Each of auxiliary fiber-reinforced resin sheets 157, 159 and 161 whose lengths sequentially decrease in that order as shown in FIG. 5 is sequentially wound by a plurality of turns around the outside circumferential surface 151 of the tube 135a except at and near the tip 149 thereof so that one end of each sheet coincides with the tip 155 of the tube, the sheets of the largest, intermediate and smallest lengths constitute an inner, an intermediate and an outer layers around the tube, respectively, and the thickness of the assembly of the tube and the sheets gradually increases toward the butt 155 of the tube while making the diameter of the outside circumferential surface of the assembly uniform. A tightening tape not shown in the drawings is then wound around the tube 135a and the sheets 157, 159 and 161 to tighten them together. The tube and the sheets are subjected to a thermosetting treatment. After that, the mandrel 147 is pulled out from the tube, and the tightening tape is peeled from the tube and the sheets. The main body 135 of 9 mm in outside diameter along the total length of the body is thus manufactured.

The moduli of elasticity of the auxiliary sheets 157, 159 and 161 are sequentially increased in that order reversely to the lengths thereof so that the rigidity of the main body 135 is modulated toward the butt thereof.

Since the butt 139 of the main body 135 is smaller in outside diameter than that of the main body of the shaft of a conventional golf club and the former main body is uniform in outside diameter, the resistance of air to the former body at the time of swinging of the club is lower than that to the latter body to make it possible to speed up the swinging. Besides, the thickness w of the main body 135 is gradually increased from the tip 137 thereof to the butt 139 thereof to heighten the rigidity of the body toward the butt. The golf club including the shaft having the main body 135 is thus made low enough in air resistance and high enough in rigidity for a powerful golfer to swing the club quickly.

The tapering of the outside circumferential surface of each of the main bodies 107 and 135 is not affected by such a fact that the head conjoining portion or grip conjoining portion of the body is reinforced to be larger in thickness than the other portion thereof. Besides, the inside circumferential surface of each of the bodies 107 and 135 may not be tapered but uniform in diameter.

Figure 6:
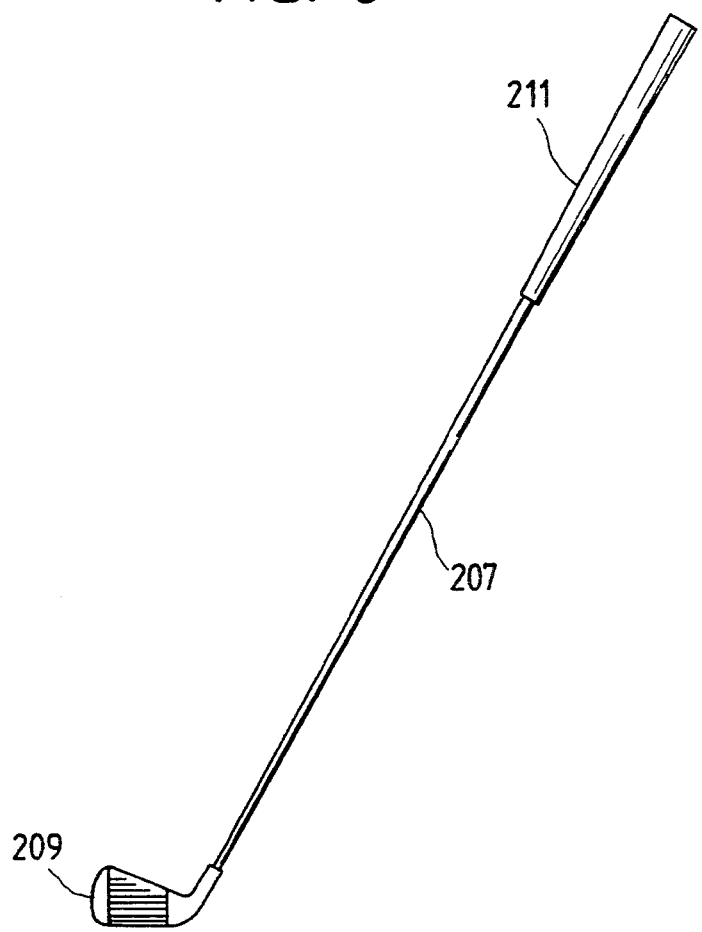
FIG. 6 is a front view of a golf club including a shaft which is yet another embodiment of the invention.

FIG. 6 shows a golf club including a shaft which is yet another of the embodiments and has a tubular main body 207 made of a resin and carbon fibers reinforcing the resin. The golf club also includes a head 209 conjoined to the main body 207 at the tip thereof. The shaft also has a grip 211 conjoined to the main body 207 at the butt thereof. The main body 207 is nearly uniform in outside diameter from the butt thereof to the tip thereof, and is smaller in outside diameter than that of the shaft of a conventional golf club so that the resistance of air to the former main body at the time of swinging of the club is lower than that to the latter main body.

Figure 7:
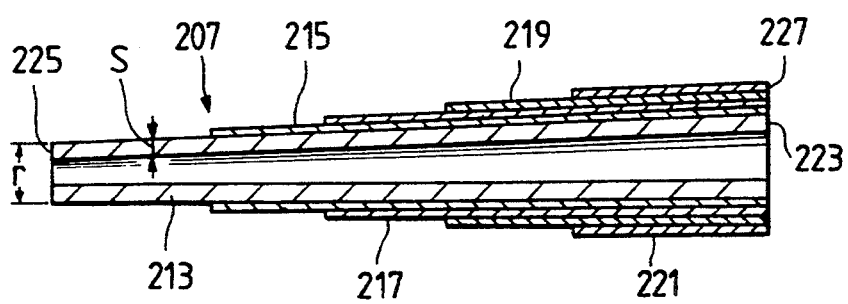
FIG. 7 is a longitudinally sectional view of the shaft shown in FIG. 6.

FIG. 7 shows a longitudinal section of the main body 207 including a main tube 213 made of a fiber-reinforced resin, a first reinforcing layer 215 made of an auxiliary fiber-reinforced resin sheet wound by one turn on the outside circumferential surface of the tube, a second reinforcing layer 217 made of another auxiliary fiber-reinforced resin sheet wound by one turn on the outside circumferential surface of the former layer, a third reinforcing layer 219 made of yet another auxiliary fiber-reinforced resin sheet wound by one turn on the outside circumferential surface of the second reinforcing layer, and a fourth reinforcing layer 221 made of yet another auxiliary fiber-reinforced resin sheet wound by one turn on the outside circumferential surface of the third reinforcing layer, so that end of each of the sheets coincides with the butt 223 of the tube. The lengths of the reinforcing layer 215, 217, 219 and 221 sequentially decrease in that order as shown in FIG. 7. Since the reinforcing layers are provided on the main tube 213 as described above, the outside circumferential surface of the main body 207 is tapered from the butt 227 thereof to the tip 225 thereof at a ratio of about 3/1,000 and the thickness of the body is gradually increased from the tip to the butt. The outside diameter r of the tip 225 is about 8 mm. The main body 207 is nearly uniform in outside diameter.

The moduli of elasticity of the reinforcing layers 215, 217, 219 and 221 are sequentially increased in that order reversely to the lengths thereof so that the rigidity of the main body 207 is gradually heightened toward the butt 227 thereof.

The fiber-reinforced resin sheet constituting the main tube 213 is composed of a matrix of a synthetic resin such as an epoxy resin and a polyester resin, and carbon fibers impregnated with the resin and reinforcing it. The outside circumferential surface of the tube is tapered from the butt thereof to the tip thereof at a ratio of about 2/1,000. The thickness s of the tube is nearly uniform along the total length thereof.

Each of the auxiliary fiber-reinforced resin sheets constituting the reinforcing layers 215, 217, 219 and 221 is composed of a matrix of a resin, and carbon fibers impregnated with the resin and reinforcing it. To gradually heighten the rigidity of the main body 207 toward the butt 227 thereof, the carbon fibers of the first layer 215, those of the second layer 217, those of the third layer 219 and those of the fourth layer 221 are set at 30 ton/mm$^2$, 35 ton/mm$^2$, 40 ton/mm$^2$ and 46 ton/mm$^2$ in modulus of elasticity, respectively.

Figure 8:
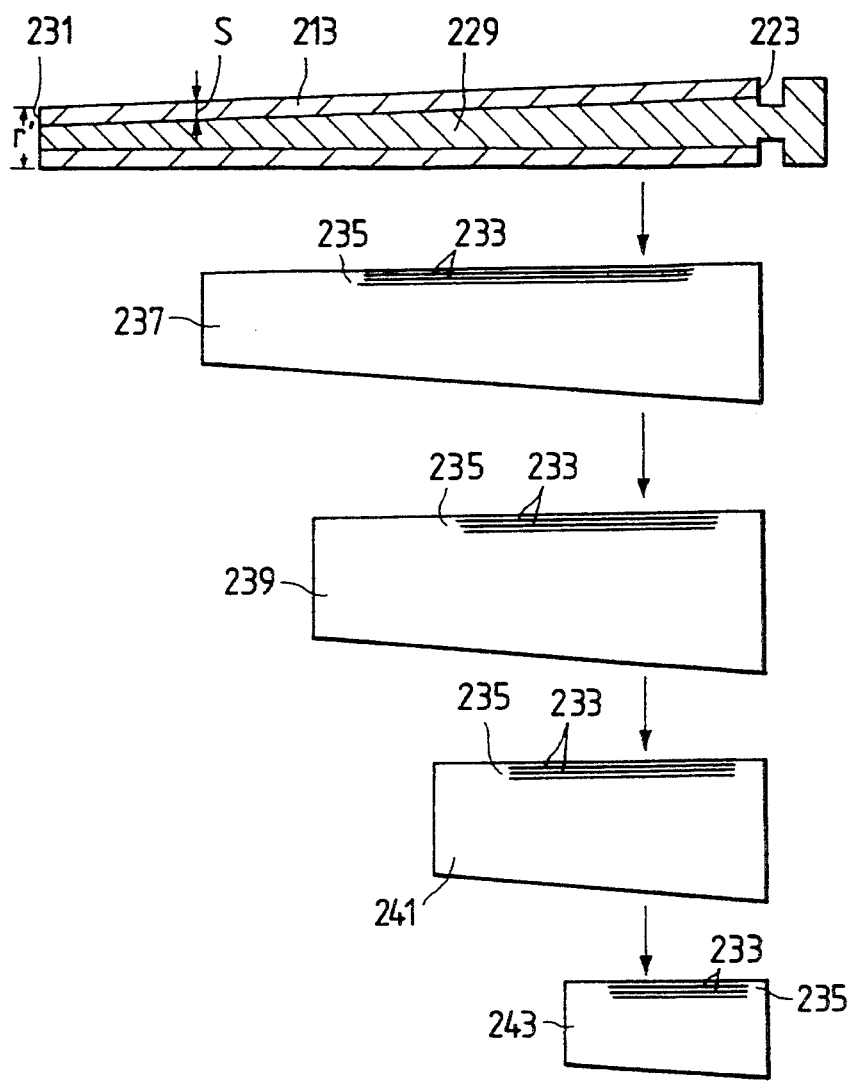
FIG. 8 is a view illustrate a method of manufacturing the shaft shown in FIG. 6.

The main body 207 is manufactured as described with reference to FIG. 8 from now on. The fiber-reinforced resin sheet is first wound by a plurality of turns on the outside circumferential surface of a mandrel 229 along nearly the total length thereof so that the sheet constitutes the main tube 213 whose tip 231 has an outside diameter r′ of 8 mm and whose thickness s is nearly uniform from the tip to the butt 223 thereof. The first auxiliary fiber-reinforced resin sheet 237 composed of the matrix of an epoxy resin or the like and the carbon fibers 233 oriented in a direction and impregnated with the matrix to reinforce it is wound by one turn on the outside circumferential surface of the tube 213 except at and near the tip 231 thereof so that the sheet constitutes the first reinforcing layer 215 and coincides with the butt 223 of the tube at one end of the sheet. Each of the other auxiliary fiber-reinforced resin sheets 239, 241 and 243 each having the same composition as the first auxiliary fiber-reinforced resin sheet 237 except for the modulus of elasticity as described above is thereafter sequentially wound by one turn around the first reinforcing layer 215 so that the sheets 239, 241 and 243 constitute the second, the third and the fourth reinforcing layers 217, 219 and 221, respectively, and coincide with the butt 223 of the tube 213 at one end of each of the sheets. A tightening tape not shown in the drawings is then around the tube and the sheets to tighten them together. The tube and the sheets are subjected to a thermosetting treatment. After that, the mandrel 229 is pulled out from the tube, and the tightening tape is peeled from the tube and the sheets. The main body 207 is thus manufactured. Since the auxiliary sheets 237, 239, 241 and 243 whose lengths sequentially decrease in that order are wound together around the main tube 213 so as to coincide with the butt 223 thereof at one end of each sheet, the main body 207 is reinforced increasingly toward the butt thereof.

Since the main body 207 is smaller in outside diameter than that of the shaft of a conventional golf club and nearly uniform in outside diameter, the resistance of air to the former body at the time of swinging of the club is lower than that to the latter body to make it possible to speed up the swinging. Besides, the main body 207 is heightened in rigidity by providing the four reinforcing layers 215, 217, 219 and 221 whose elasticity sequentially increase toward the butt 227 of the body. The golf club including the shaft having the main body 207 is thus made low enough in air resistance and high enough in rigidity for a powerful golfer to swing the club quickly.

Figure 9:
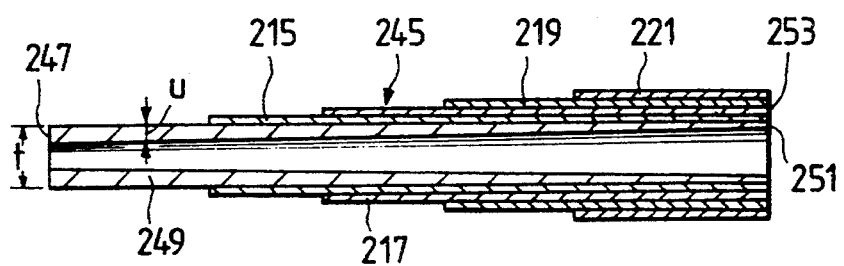
FIG. 9 is a longitudinally sectional view of a shaft which is for a golf club and is yet another embodiment of the invention.

FIG. 9 shows a longitudinal section of the tubular main body 245 of the shaft of a golf club, which is yet another of the embodiments. The outside diameter t of the tip 247 of the main body 245 is about 8 mm. The portion of the main body 245 which are equivalent to those of the preceding embodiment are denoted by the same reference symbols as them, and not described in detail hereinafter. The main body 245 includes a main tube 249, and reinforcing layers 215, 217, 219 and 221 sequentially provided around the tube so that one end of each layer coincide with the butt 251 of the tube, and the outside circumferential surface of the body is tapered from the butt 253 thereof to the tip 247 thereof at a ratio of about 3/1,000, and nearly uniform in diameter. The thickness u of the main tube 249 is gradually decreased from the tip thereof to the butt 251 thereof, but the reinforcing layers 215, 217, 219 and 221 are sequentially provided around the tube so that the thickness of the main body is nearly uniform from the tip 247 thereof to the butt 253 thereof.

Figure 10:
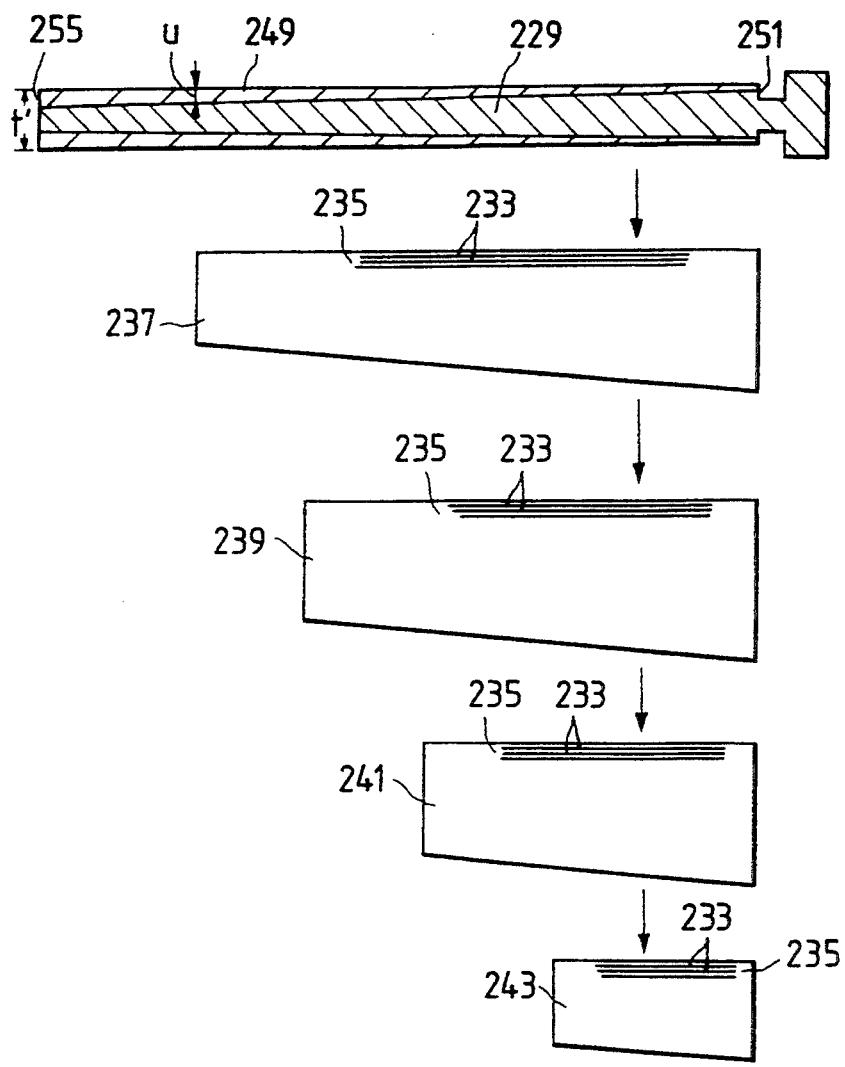
FIG. 10 is a view to illustrate a method of manufacturing the shaft shown in FIG. 9.

The main body 245 is manufactured as described with reference to FIG. 10 from now on. A fiber-reinforced resin sheet is first wound by a plurality of turns on the outside circumferential surface of a mandrel 229 along nearly the total length thereof so that the sheet constitutes the main tube 249 whose tip 255 has an outside diameter t' of about 8 mm, whose outside circumferential surface is tapered from the butt 251 of the tube to the tip thereof at a ratio of about 0/1,000, and whose thickness u is gradually decreased from the tip to the butt. Each of auxiliary fiber-reinforced resin sheets 237, 239, 241 and 243 is then sequentially wound by one turn around the main tube 249 so that the sheets coincide with the butt 251 of the tube at one end of each sheet, and constitute the reinforcing layers 215, 217, 219 and 221, respectively. A tightening tape is thereafter wound around the tube and the sheets to tighten them together. The tube and the sheets are subjected to a thermosetting treatment. After that, the mandrel 229 is pulled out from the tube, and the tightening tape is peeled from the tube and the sheets. The main body 245 is thus manufactured.

Since the main body 245 is smaller in outside diameter than that of the shaft of a conventional golf club and tapered from the butt 253 thereof to the tip 247 thereof at the ratio of about 3/1,000 so as to be nearly uniform in outside diameter, the resistance of air to the former body at the time of swinging of the club is lower than that to the latter body to make it possible to speed up the swinging. Besides, the rigidity of the main body 245 is heightened by providing the four reinforcing layers 215, 217, 219 and 221 whose moduli of elasticity sequentially increase in that order toward the butt 251 of the body. The golf club including the shaft having the main body 245 is thus made low enough in air resistance and high enough in rigidity for a powerful golfer to swing the club quickly.

Figure 11:
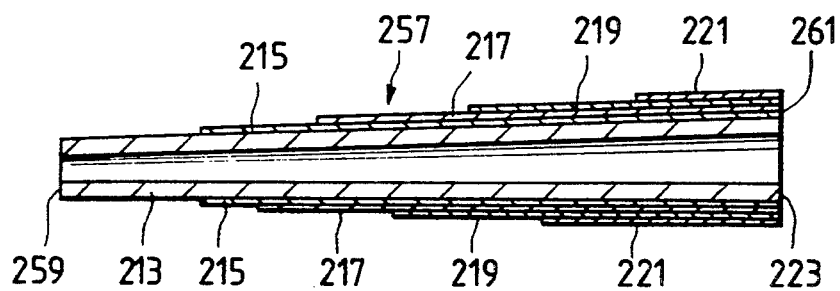
FIG. 11 is a longitudinally sectional view of a shaft which is for a golf club and is yet another embodiment of the invention.

FIG. 11 shows a longitudinal section of the tubular main body 257 of the shaft of a golf club, which is yet another of the embodiments. The portions of the main body 257 which are equivalent to those of the embodiment shown in FIG. 7 are denoted by the same reference symbols as them, and not described in detail hereinafter. The main body 257 includes a main tube 213, and a nearly triangular fiber-reinforced resin sheet wound on the outside circumferential surface of the tube so that the sheet constitutes reinforcing layers 215, 217, 219 and 221 piled together in that order and coincident with the butt 223 of the tube at one end of each layer. The outside circumferential surface of the main body 257 is tapered from the butt 261 thereof to the tip 259 thereof at a ratio of about 3/1,000 so as to be nearly uniform in diameter. The thickness of the main body is gradually increased from the tip thereof to the butt thereof.

Figure 12:
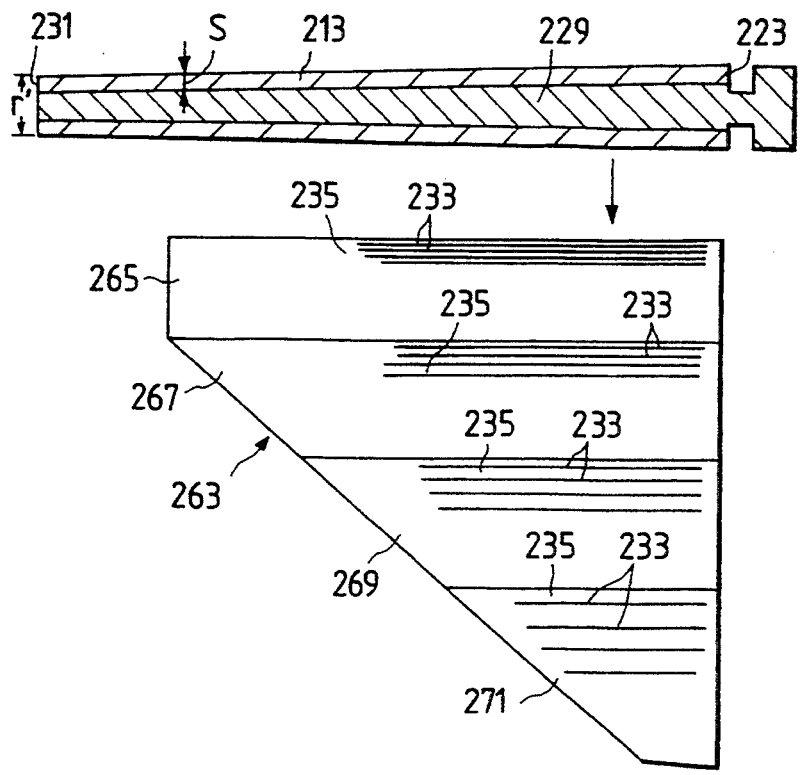
FIG. 12 is a view to illustrate a method of manufacturing the shaft shown in FIG. 11.

The main body 257 is manufactured as described with reference to FIG. 12 from now on. A fiber-reinforced resin sheet is first wound by a plurality of turns on the tapered outside circumferential surface of a mandrel 229 along nearly the total length thereof so that the sheet constitutes the main tube 213 whose tip 231 has an outside diameter r' of about 8 mm and whose thickness s is nearly uniform from the tip to the butt 223 of the tube. The nearly triangular fiber-reinforced resin sheet 263 which is composed of a matrix 235 of a synthetic resin such as an epoxy resin and a polyester resin and carbon fibers 233 oriented in a direction and impregnated with the resin and has a first, a second, a third and a fourth portions 265, 267, 269 and 271 continuously provided together along one edge of the sheet is wound on the outside circumferential surface of the main tube 213 so that the edge coincides with the butt 223 of the tube, and the portions constitute the reinforcing layers 215, 217, 219 and 221, respectively. The carbon fibers 233 of the first portion 265, those 233 of the second portion 267, those 233 of the third portion 269 and those 233 of the fourth portion 271 are 30 ton/mm$^2$, 35 ton/mm$^2$, 40 ton/mm$^2$ and 46 ton/mm$^2$ in modulus of elasticity, respectively. Each of the portions 265, 267, 269 and 271 is sequentially wound in that order by one turn around the main tube 213 so that the portions constitute the reinforcing layers 215, 217, 219 and 221 coincident with the butt 223 of the tube at one end of each layer but sequentially different from each other in location along the longitudinal direction of the tube. A tightening tape is thereafter wound on the tube and the sheet to tighten them together. The tube and the sheet are subjected to a thermosetting treatment. After that, the mandrel 229 is pulled out from the tube, and the tightening tape is peeled from the tube and the sheet. The main body 257 is thus manufactured.

Since the main body 257 is smaller in outside diameter than that of the shaft of a conventional golf club and tapered from the butt 261 thereof to the tip 259 thereof at the ratio of about 3/1,000 so as to be nearly uniform in outside diameter, the resistance of air to the former body at the time of swinging of the golf club is lower than that to the latter body to make it possible to speed up the swinging. Besides, the rigidity of the main body 257 is heightened by providing the four reinforcing layers 215, 217, 219 and 221 whose moduli of elasticity sequentially increase toward the butt 261 of the body. The golf club including the shaft having the main body 257 is thus made low enough in air resistance and high enough in rigidity for a powerful golfer to swing the club quickly.

The tapering of the outside circumferential surface of each of the main bodies of the shafts which are the embodiments described above is not affected by such a fact that the head conjoining portion or grip conjoining portion of the body is reinforced to be larger in thickness than the other portion thereof. Even if an auxiliary sheet made of a fiberglass-reinforced resin with a low modulus of elasticity or made of the like is wound on each of the main bodies 207, 245 and 257 to improve the appearance thereof, it does not affect the feature of the present invention. Although the carbon fibers 233 of the auxiliary sheets 237, 239, 241 and 243 are 30 ton/mm$^2$, 35 ton/mm$^2$, 40 ton/mm$^2$ and 46 ton/mm$^2$ in modulus of elasticity, respectively, they are not confined to these values but the carbon fibers of the sheets 237 and 239, for example, may be 30 ton/mm$^2$ in modulus of elasticity.

Figure 13:
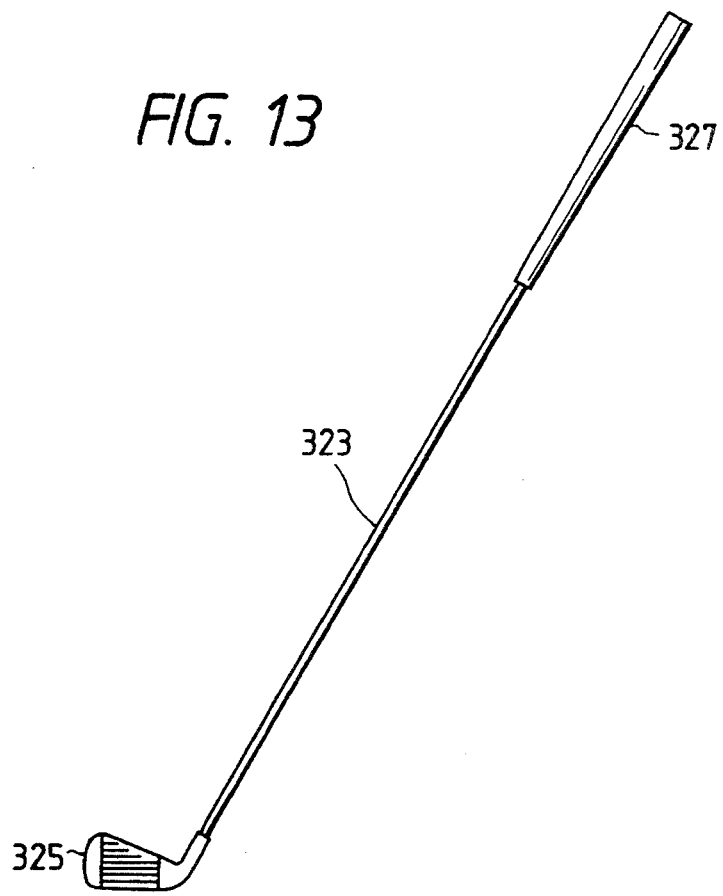
FIG. 13 is a front view of a golf club including a shaft which is yet another embodiment of the invention.

FIG. 13 shows a golf club including a shaft which is yet another of the embodiments. The club also includes a head 325 conjoined to the shaft at the tip thereof. The shaft includes a main body 323, and a grip 327 conjoined thereto at the butt thereof. The outside diameter of the tip of the main body 323 is 10 mm or less. The outside circumferential surface of the main body 323 is tapered from the butt thereof to the tip thereof at a ratio of 0/1,000 to 4/1,000 so as to be nearly uniform in diameter. The main body 323 is smaller in outside diameter than that of the shaft of a conventional golf club so that the resistance of air to the former body at the time of swinging of the club is lower than that to the latter body.

Figure 14:
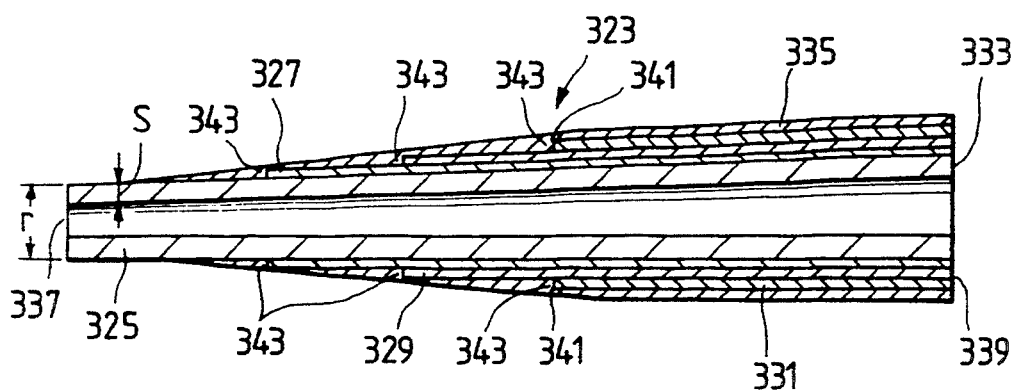
FIG. 14 is a longitudinally sectional view of the shaft shown in FIG. 13.

FIG. 14 shows a longitudinal section of the main body 323 including a main tube 325 made of a fiber-reinforced resin, a first, a second and a third reinforcing layers 327, 329 and 331 each made of a carbon-fiber-reinforced resin sheet wound by one turn around the tube so as to coincide with the butt 333 of the tube at one end of the sheet, and a protective layer 335 made of a fiberglass-reinforced resin sheet wound by a plurality of turns on all the reinforcing layers to cover them. The lengths of the reinforcing layers 327, 329 and 331 sequentially decrease in that order so that the inner layer 327, the intermediate layer 329 and the outer layer 331 have the largest length, the intermediate length and the smallest length, respectively. The reinforcing layers are sequentially provided around the main tube 325 so that one end of each of the layers coincides with the butt 333 of the tube, and the main body 323 is tapered from the butt 339 thereof to the tip 337 thereof at the ratio of about 3/1,000 so as to be nearly uniform in outside diameter along the total length of the body, gradually increase in thickness from the tip to the butt, and have an outside diameter r of about 8 mm at the tip. The moduli of elasticity of the reinforcing layers 327, 329 and 331 sequentially increase in that order so that the rigidity of the main body 323 gradually increases toward the butt 339 thereof.

To manufacture the main tube 325, a fiber-reinforced resin sheet composed of a matrix of a synthetic resin such as an epoxy resin and a polyester resin and carbon fibers impregnated with the resin is wound on the outside circumferential surface of a mandrel so that the sheet constitutes the tube whose outside circumferential surface is tapered from the butt thereof to the tip thereof at a ratio of about 2/1,000 and whose thickness s is nearly uniform along the total length of the tube.

The carbon-fiber-reinforced resin sheet for each of the reinforcing layers 327, 329 and 331 is composed of a matrix of a resin and carbon fibers impregnated with the resin. To gradually heighten the rigidity of the main body 323 toward the butt 339 thereof, the modulus of elasticity of the carbon fibers of the sheet for the first reinforcing layer 327, that of those of the sheet for the second reinforcing layer 329 and that of those of the sheet for the third reinforcing layer 331 are set at 30 ton/mm², 40 ton/mm² and 46 ton/mm², respectively.

Figure 15:
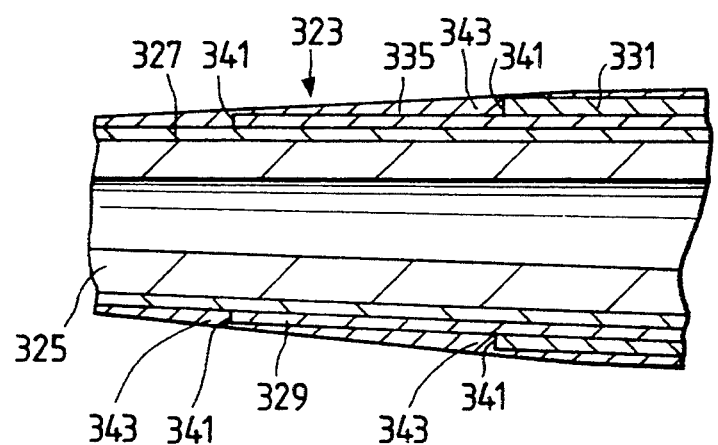
FIG. 15 is a partial enlarged sectional view of the shaft shown in FIG. 14.

The fiberglass-reinforced resin sheet for the protective layer 335 as the outermost layer of the main body 323 is lower in modulus than those for the reinforcing layers 327, 329 and 331, and is wound thereon to cover all the reinforcing layers. The protective layer 335 has thick covering portions 343 over risers or step portions 341 of the reinforcing layers 327, 329 and 331, as shown in FIGS. 14 and 15, so that the thick covering portions reinforce the main body 323 at the risers at which the main body would be most likely to be damaged. Further, since the thick covering portion 343 is gradually increased in thickness as depicted in a substantially triangular shape in cross-section shown in FIG. 15, the thick covering portion 343 connect a layer to an adjacent layer piled on the former layer while gradually increasing its elasticity so as to prevent the sudden change in elasticity at the riser between two layers.

Figure 16:
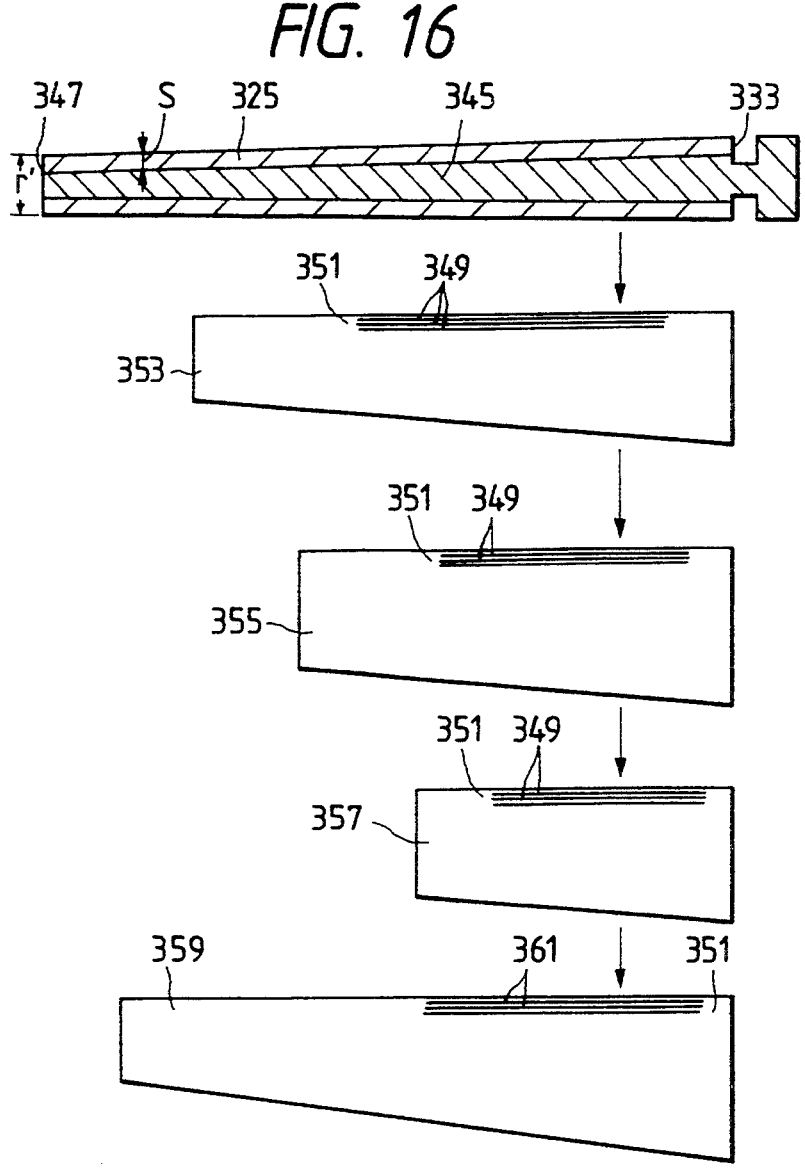
FIG. 16 is a view to illustrate a method of manufacturing the shaft shown in FIG. 14.

The main body 323 is manufactured as described with reference to FIG. 16 from now on. The fiber-reinforced resin sheet is first wound by a plurality of turns on the outside circumferential surface of the mandrel 345 along nearly the total length thereof so that the sheet constitutes the main tube 325 whose tip 347 has an outside diameter r' of about 8 mm and whose thickness s is nearly uniform from the tip to the butt 333 of the tube. The surface is tapered at a ratio of 2/1,000. The carbon-fiber-reinforced resin sheet 353 composed of the matrix of the resin such as an epoxy resin and a polyester resin, and the carbon fibers 349 oriented in a direction and impregnated with the resin is then wound by one turn on the outside circumferential surface of the tube 325 except at and near the tip 347 thereof so that the sheet coincides with the butt 333 of the tube at one end of the sheet, and constitutes the first reinforcing layer 327. Each of the other carbon-fiber-reinforced resin sheets 355 and 357 each composed of the matrix and the carbon fibers 349 oriented in a direction and impregnated with the matrix is thereafter sequentially wound by one turn around the first reinforcing layer 327 so that the sheets coincide with the butt 333 of the tube 325 at one end of each sheet, and constitute the second and the third reinforcing layers 329 and 331, respectively. The fiberglass-reinforced resin sheet 359 which is composed of a matrix 351 of a resin such as an epoxy resin and a polyester resin and glass fibers 361 oriented in a direction and impregnated with the resin and is larger in length than the reinforcing sheet 353 is wound by one turn over all the reinforcing layers 327, 329 and 331 so that the fiberglass-reinforced resin sheet coincides with the butt 333 of the main tube 325 at one end of the sheet, and constitutes the protective layer 335 covering the reinforcing layers. A tightening tape not shown in the drawings is thereafter wound on the main tube 325 and the protective layer 335. The tube 325 and the sheets 353, 355, 357 and 359 are subjected to a thermosetting treatment. After that, the mandrel 345 is pulled out from the tube, and the tightening tape is peeled from the tube and the sheets. The outside circumferential surface of the protective layer 335 is then polished so that the main body 323 does not have projections due to the risers of the reinforcing layers 327, 329 and 331. The main body 323 reinforced except at and near the tip thereof and not having projections and risers at the outside circumferential surface of the body is thus manufactured.

Since the protective layer 335 is provided to cover the reinforcing layers 327, 329 and 331, the protective layer functions so that when the main body 323 flexes during the swinging of the golf club, the mutually adjoining pair of the reinforcing layers or that of the main tube 25 and the reinforcing layer are prevented from being separated from each other due to the difference between the magnitudes of the elongations of the pair, which is due to the difference between the moduli of elasticity of the pair. Since the thick covering portions 343 are provided over the risers 341 at which the main body 323 would be most likely to be damaged, the portions reinforce the body at the risers to prevent the body from being damaged at the risers. Since the portions 343 are lower in modulus of elasticity than the reinforcing layers 327, 329 and 331, the main body 323 is prevented from being sharply bent to be damaged. In other words, it is unlikely that the mutually adjoining pair of the reinforcing layers 327, 329 and 331 or that of the main tube 325 and the reinforcing layer are separated from each other at the time of the swinging of the golf club, and the main body 323 is damaged due to stress concentration.

Since the main body 323 is smaller in outside diameter than that of the shaft of the conventional golf club and tapered to be nearly uniform in outside diameter, the resistance of air to the former main body at the time of swinging of the golf club is lower than that to the latter main body to make it possible to speed up the swinging. Besides, the rigidity of the main body 323 is heightened by providing the three reinforcing layers 327, 329 and 331 whose moduli of elasticity sequentially increase toward the butt 339 of the body. The golf club including the shaft having the main body 323 is thus made low enough in air resistance and high enough in rigidity for a powerful golfer to swing the club quickly.

In addition, the provision of the protective layer 335 is particularly effective to the above-noted arrangement for reinforcing the portion of the main body at and near the butt thereof, in which the reinforcing layers are constituted by wound carbon sheets whose moduli of elasticity sequentially increase toward the butt of the main body and whose lengths sequentially decrease toward the butt of the main body, since the damage at the risers are more likely to occur in that arrangement.

Also, the provision of the protective layer 335 is particularly effective to the arrangement in which the main body, to which a head is conjoined at the tip of the body and to which a grip is conjoined at the butt of the body, is 10 mm or less in the outside diameter of the tip, and in which the outside circumferential surface of the body is tapered from the butt to the tip at a ratio of 0/1,000 to 4/1,000 so as to be nearly uniform in diameter, since the material having the higher elasticity must be used to constitute the main body in order to supplement the relatively thin main body.

Although the fiberglass-reinforced resin sheet 359 is wound on the reinforcing layers 327, 329 and 331 so as to constitute the protective layer 335, the sheet 359 may be replaced with a carbon-fiber-reinforced resin sheet which is slightly lower in modulus of elasticity than each of the sheets 353, 355 and 356. Such replacement does not alter the desirable effects described above. In addition, the main body using the carbon-fiber-reinforced resin sheet to form the protective layer, is not reduced in modulus of elasticity as much as the main body using the fiberglass-reinforced resin sheet to form the protective layer.

Figure 17:
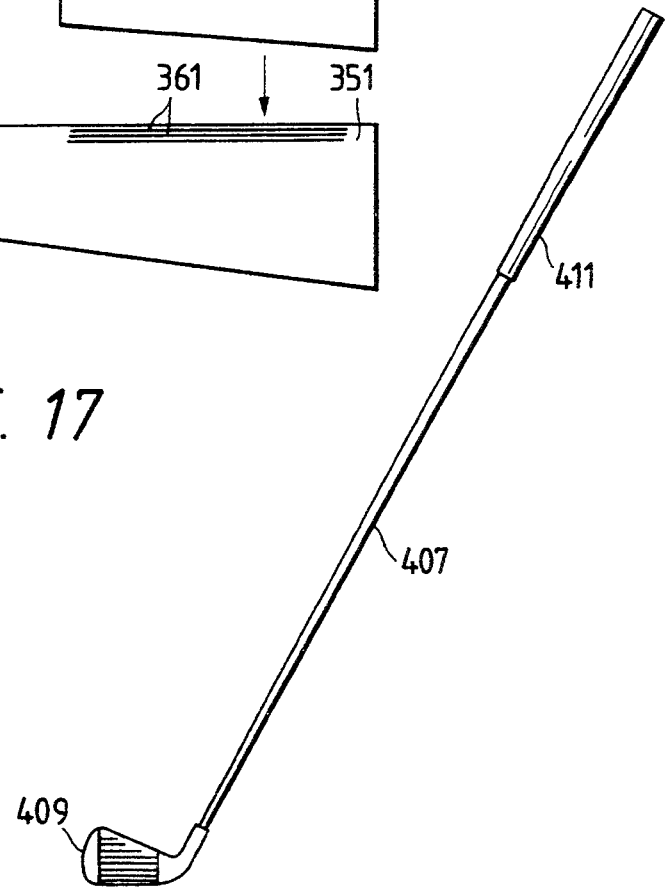
FIG. 17 is a front view of a golf club including a shaft which is yet another embodiment of the invention.

FIG. 17 shows a golf club including a shaft which is yet another of the embodiments. The shaft includes a main body 407, and a grip 411 conjoined thereto at the butt thereof. The golf club also includes a head 409 conjoined to the main body 407 at the tip thereof. The main body 407 is 10 mm or less in the outside diameter of the tip thereof. The outside circumferential surface of the main body is tapered from the butt thereof to the tip thereof at a ratio of 0/1,000 to 4/1,000 so as to be nearly uniform in diameter. The main body is smaller in outside diameter than that of the shaft of a conventional golf club so that the resistance of air to the former body at the time of swinging of the club is lower than that to the latter body.

Figure 18:
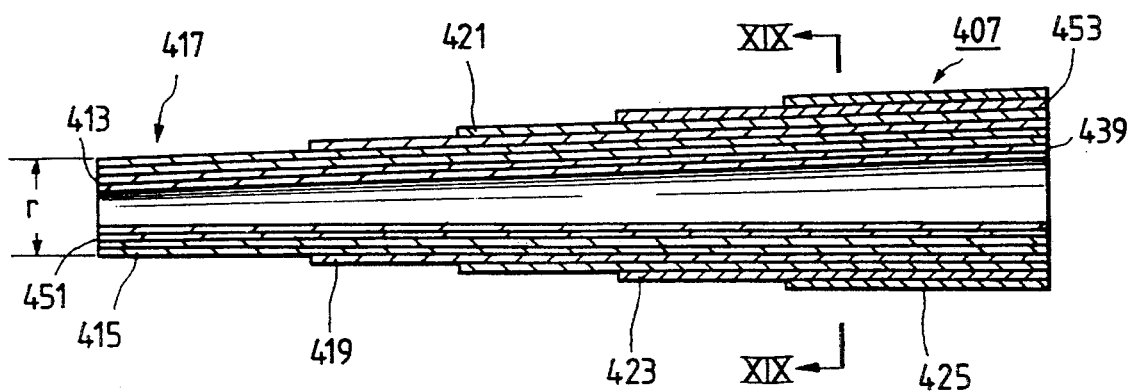
FIG. 18 is a longitudinally sectional view of the shaft shown in FIG. 17.
Figure 19:
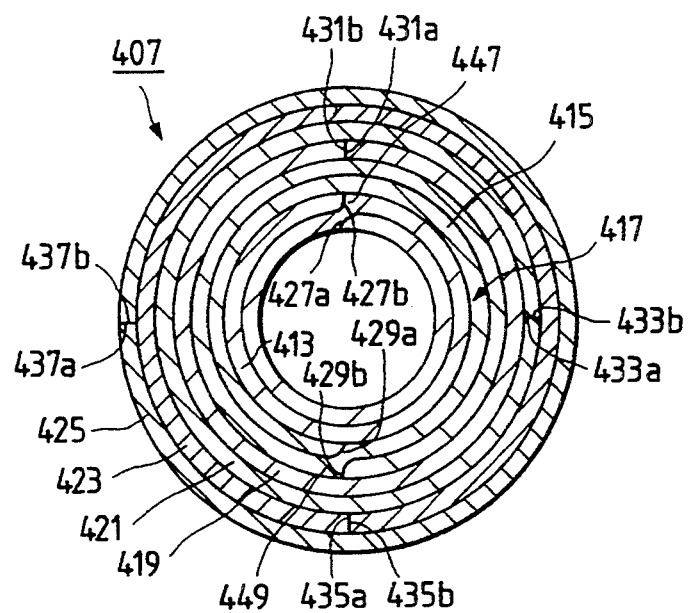
FIG. 19 is a sectional view of the shaft along lines 19—19 shown in FIG. 18.
Figure 20:
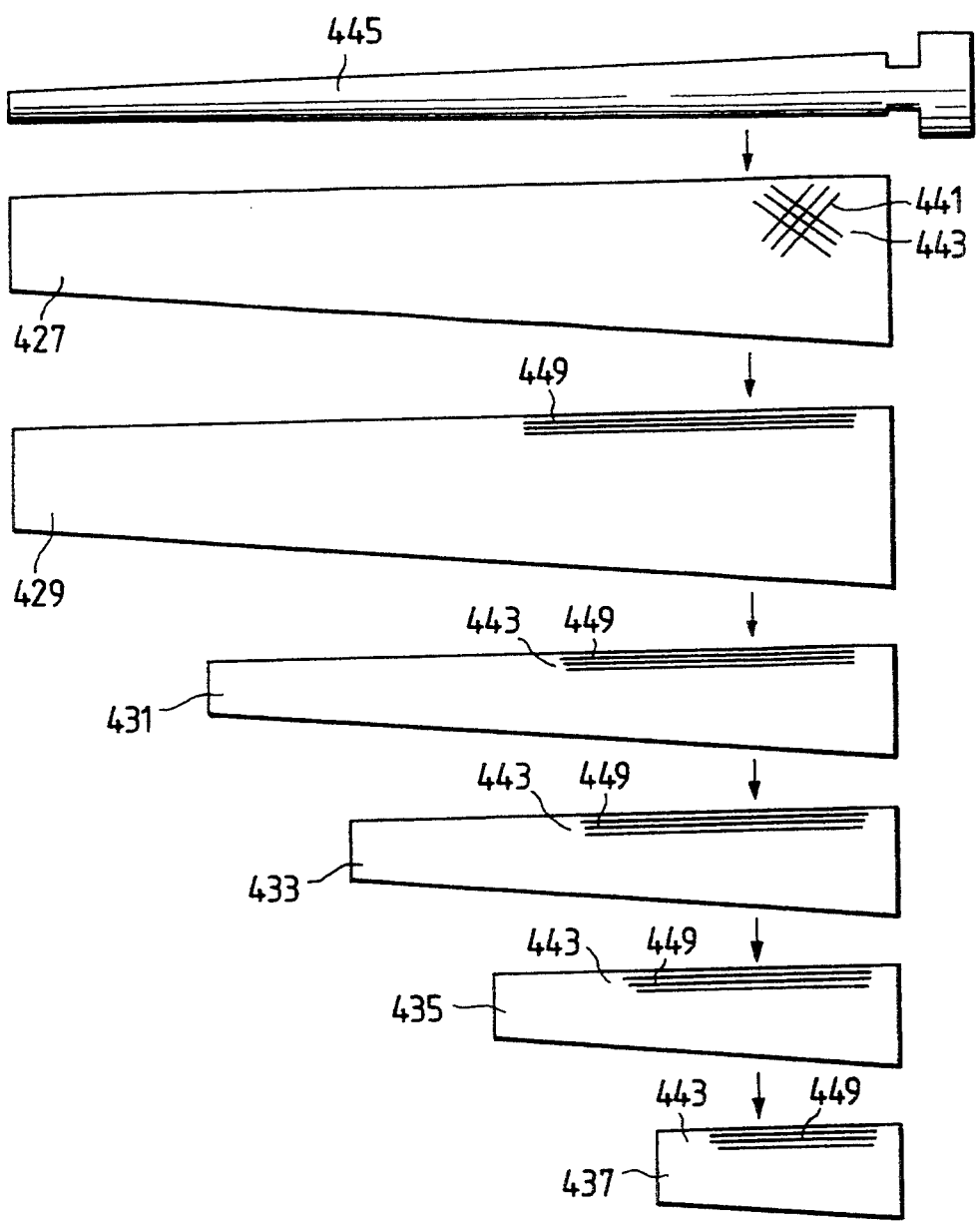
FIG. 20 is a view to illustrate a method of manufacturing the shaft shown in FIG. 18.

The main body 407 includes a main tube 417 composed of an inner layer 413 and an outer layer 415, a first reinforcing layer 419, a second reinforcing layer 421, a third reinforcing layer 423, and a fourth reinforcing layer 425, as shown in FIG. 18. The reinforcing layers 419, 421, 423 and 425 are sequentially provided in that order around the main tube 417 so that the layers coincide with the butt of the tube at one end of each layer. To provide the inner and the outer layers 413 and 415, each of two prepreg sheets 427 and 429 is wound by two turns, as shown in FIGS. 19 and 20. To provide the reinforcing layers 419, 421, 423 and 425, each of four prepreg sheets 431, 433, 435 and 437 is wound by one turn around the main tube 417 so that the sheets coincide with the butt 439 of the tube at one end of each sheet, as shown in FIGS. 19 and 20.

The prepreg sheet 427 composed of a matrix 443 and a woven fabric 441 made of carbon fibers and impregnated with the matrix is wound by two turns around a mandrel 445 so that the sheet constitutes the inner layer 413, as shown in FIG. 20. Although one side edge 427a of the sheet 427 is covered with the other portion thereof during the winding of the sheet so that it forms a riser 447, the other side edge 427b of the sheet is butted to the riser so that the inner layer 413 is uniform in thickness along the circumference thereof, as shown in FIG. 19. The prepreg sheet 429 made of carbon fibers 449 oriented in a direction is wound by two turns around the inner layer 413 so that the sheet constitutes the outer layer 415. The inner side edge 429a of the sheet 429 is located at an angular interval of 180 degrees from the outer side edge 427b of the former sheet 427, and the outer side edge 429b of the latter sheet is butted to the riser 449 thereof, which is formed because the inner side edge of the sheet is covered with the other portion of the sheet. The thickness of the outer layer 415 is thus made uniform along the circumference thereof.

The lengths of the reinforcing layers 419, 421, 423 and 425 sequentially decrease in that order so that the innermost and the outermost layers have the largest and the smallest lengths, respectively. Since these reinforcing layers are provided around the main tube 417 to coincide with the butt 439 thereof at one end of each layer, the outside circumferential surface of the main body 407 is tapered from the butt 453 thereof to the tip 451 thereof at a ratio of 3/1,000 so as to be nearly uniform in outside diameter, and the thickness of the body is gradually increased from the tip to the butt. The outside diameter r of the tip 451 of the main body is 8 mm. Since the prepreg sheets 431, 433, 435 and 437 for the reinforcing layers sequentially increase in modulus of elasticity in that order so that the innermost and the outermost sheets have the lowest and the highest moduli of elasticity, respectively, the rigidity of the main body 407 gradually increases toward the butt 453 thereof. Each of the prepreg sheets 431, 433, 435 and 437 is sequentially wound by one turn so that the portions of each sheet are not overlapped with each other, but both the side edges of the sheet are butted to each other, and the buttings of the sheets are located at angular intervals of 90 degrees from each other, as shown in FIG. 19.

The main body 407 is manufactured as described with reference to FIGS. 19 and 20 from now on. The prepreg sheet 427 is first wound by two turns on the outside circumferential surface of the mandrel 445 along nearly the total length thereof so that the sheet constitutes the inner layer 413 in which the outer side edge 427b of the sheet is butted to the riser 447 formed by the sheet due to the overlapping of the inner side edge and other portion thereof during the winding of the sheet. The outside circumferential surface of the mandrel 445 is tapered by a ratio of about 2/1,000. The prepreg sheet 429 is then wound by two turns on the inner layer 413 so that the sheet constitutes the outer layer 415 in which the inner side edge 429a of the sheet is located at the angular interval of 180 degrees from the outer side edge 427b of the former sheet, and the outer side edge 429b of the latter sheet is butted to the riser 449 formed by the sheet due to the overlapping of the inner side edge 429a and outer portion thereof during the winding of the sheet. The main tube 417 whose outside circumferential surface is tapered at a ratio of about 2/1,000 and whose thickness is nearly uniform along the total length of the tube is thus made of the inner and the outer layers 413 and 415. The prepreg sheet 431 composed of a matrix 443 and carbon fibers 449 oriented in a direction and impregnated with the matrix is wound by one turn on the outside circumferential surface of the main tube 417 except at and near the tip thereof so that the sheet constitutes the first reinforcing layer 419 in which both the side edges 431a and 431b of the sheet are butted to each other, as shown in FIG. 19. The prepreg sheet 433 composed of a matrix 443 and carbon fibers 449 oriented in a direction and impregnated with the matrix is wound by one turn on the outside circumferential surface of the first reinforcing layer 419 so that the sheet constitutes the second reinforcing layer 421 in which both the side edges 433a and 433b of the sheet are butted to each other at the angular interval of 90 degrees from the butting of the side edges of the inner sheet 431. The prepreg sheets 435 and 437 each composed of a matrix 443 and carbon fibers 449 oriented in a direction and impregnated with the matrix are thereafter sequentially wound around the second reinforcing layer 421 so that the sheet 435 constitutes the third reinforcing layer 423 in which the side edges 435a and 435b. of the sheet are butted to each other at the angular interval of 90 degrees from the butting of the side edges of the sheet 433, and the sheet 437 constitutes the fourth reinforcing layer 425 in which the side edges 437a and 437b of the sheet are butted to each other at the angular interval of 90 degrees from the butting of the side edges of the sheet 435. A tightening tape not shown in the drawings is thereafter wound around the main tube 417 and the sheets 431, 433, 435 and 437 to tighten them together. The tube and the sheets are subjected to a thermosetting treatment. After that, the mandrel 445 is pulled out from the tube, and the tightening tape is peeled from the tube and the sheets. The main body 407 is thus manufactured.

Since the butting of the side edges 427a and 427b of the prepreg sheet 427 constituting the inner layer 413 of the main tube 417 of the main body 407 is located at the angular interval of 180 degrees from that of the side edges 429a and 429b of the prepreg sheet 429 constituting the outer layer 415 of the tube and the buttings of the side edges of the prepreg sheets 431, 433, 435 and 437 constituting the reinforcing layers 419, 421, 423 and 425 are located at the angular intervals of 90 degrees from each other so that the rigidity of the main body is made uniform along the circumference thereof, the head 409 of the golf club is less likely to deflect when the club is swung.

Figure 21:
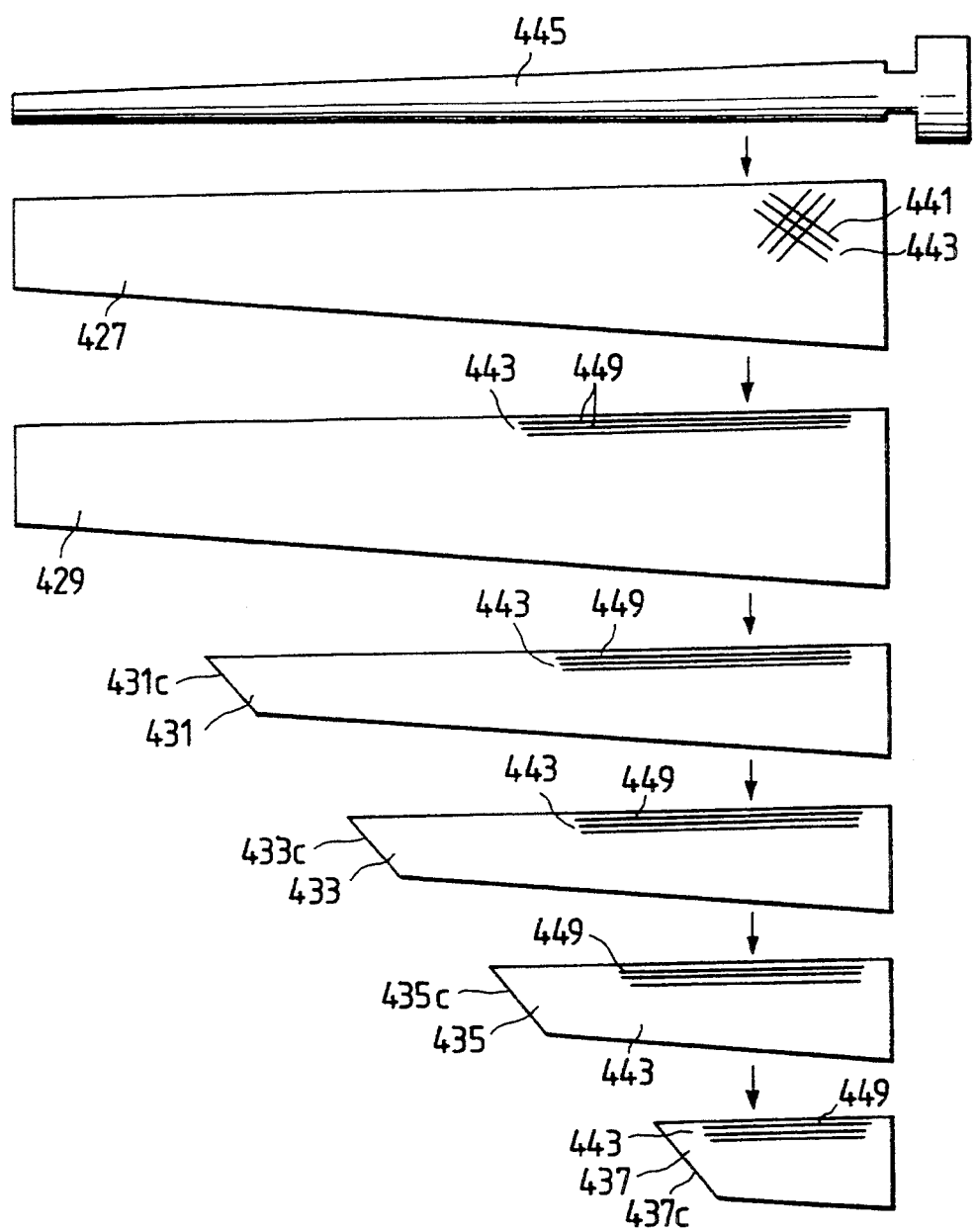
FIG. 21 is a view illustrate a method of manufacturing a shaft which is a modification of that shown in FIG. 18.
Figure 22:
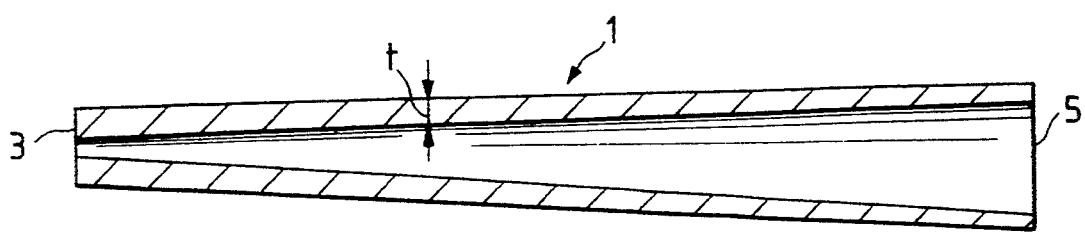
FIG. 22 is a longitudinally sectional view of a conventional shaft for a golf club.
Figure 23:
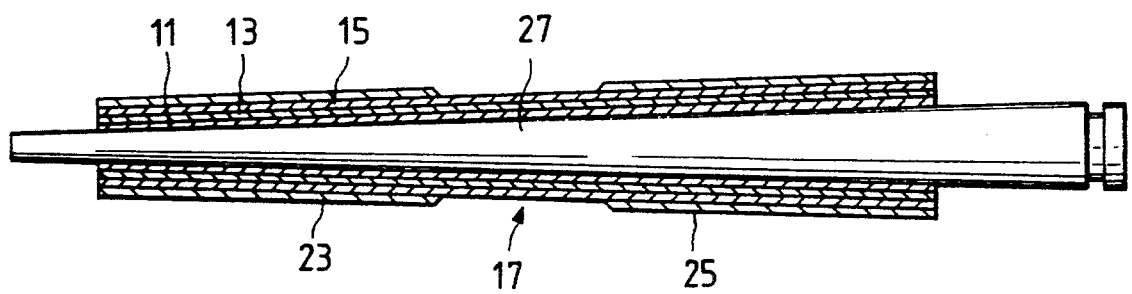
FIG. 23 is a longitudinally sectional view of another conventional shaft for a golf club.
Figure 24:
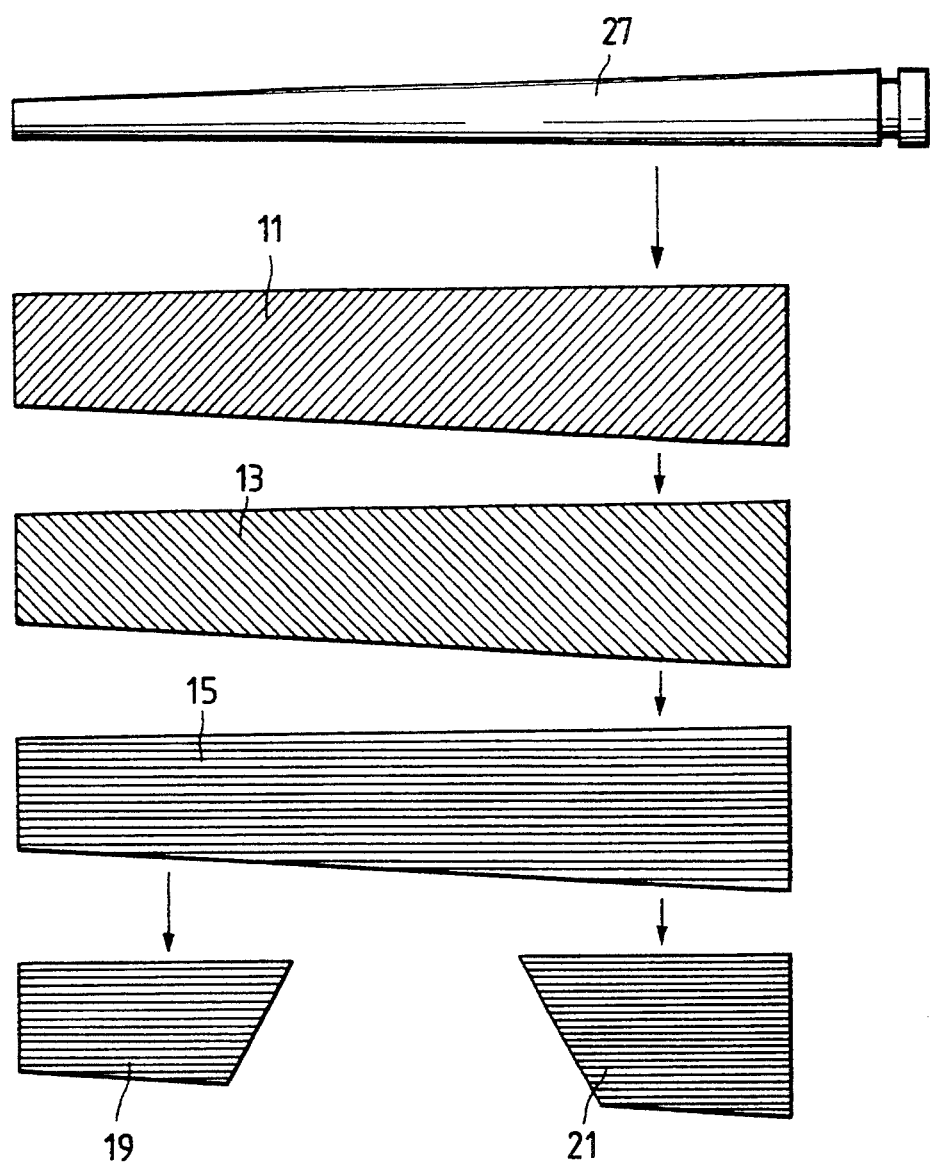
FIG. 24 is a view to illustrate a method of manufacturing the shaft shown in FIG. 23.
Figure 25:
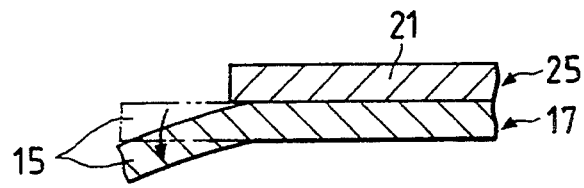
FIG. 25 is a partial sectional view of the latter conventional shaft to illustrate the separation of the reinforcing layer and other portion of the main body thereof.
Figure 26:
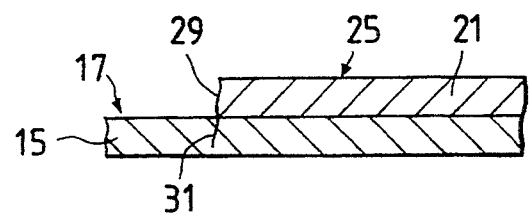
FIG. 26 is a partial sectional view of the latter conventional shaft to illustrate damage to the portion.
Figure 27:
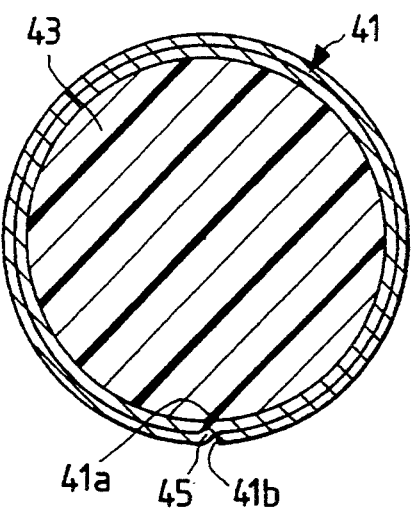
FIG. 27 is a cross-sectional view of yet another conventional shaft for a golf club.

The prepreg sheets 431, 433, 435 and 437 may have oblique ends opposite the butt of the main tube 417, as shown in FIG. 21, so that the corresponding ends of the reinforcing layers are spirally wound to make the outside circumferential surface of the main body slightly more smooth than the embodiment described above.

Since the main body 407 is smaller in outside diameter than that of the shaft of the conventional golf club so as to be nearly uniform in outside diameter, the resistance of air to the former body at the time of swinging of the club is lower than that to the latter body to make it possible to speed up the swinging. Besides, the rigidity of the main body 407 is heightened by providing the four reinforcing layers 419, 421, 423 and 425 whose moduli of elasticity sequentially increase toward the butt 453 of the body. The golf club including the shaft having the main body 407 is thus made low enough in air resistance and high enough in rigidity for a powerful golfer to swing the club quickly.

The above-noted circumferentially uniform distribution of the buttings of the wound sheets is particularly effective to the arrangement in which the main body, to which a head is conjoined at the tip of the body and to which a grip is conjoined at the butt of the body, is 10 mm or less in the outside diameter of the tip, and in which the outside circumferential surface of the body is tapered from the butt to the tip at a ratio of 0/1,000 to 4/1,000 so as to be nearly uniform in diameter, since such main body having a relatively reduced diameter is more likely to be affected in rigidity thereof by the buttings.

Although each of the prepreg sheets 425 and 427 for the inner and outer layers 413 and 415 of the main tube 417 is wound by two turns and each of the prepreg sheets 431, 433, 435 and 437 for the reinforcing layers 419, 421, 423 and 425 is wound by one turn around the tube, the numbers of the turns are not confined thereto because the embodiment is characterized in that each of the sheets is wound by one turn or an integer of turns to nearly uniformly distribute the locations of the buttings of the sheets along the circumference of the main body.

According to the present invention, a shaft for a golf club head including a tubular main body made of a fiber-reinforced resin and being 10 mm or less in the outside diameter of the tip of the body and in which the outside circumferential surface of the body is tapered from the butt to the tip thereof at a ratio of 0/1,000 to 4/1,000 so as to be nearly uniform in diameter, is reinforced gradually from the tip to the butt thereof by gradually increasing the thickness of the body from the tip to the butt or by providing reinforcing layers whose moduli of elasticity sequentially increase toward the butt of the body. The golf club including the shaft is thus made low enough in air resistance and high enough in rigidity for a powerful golfer to swing the club quickly. In case that the inside circumferential surface4 of the tubular main body is tapered at a smaller ratio than the outside circumferential surface thereof, or the inside circumferential surface of the tubular main body is tapered so that the diameter of the internal opening of the body gradually decreases from the tip thereof the butt thereof, it is easier to increase the strength of the portion at and near the butt of the shaft. In case that the inside circumferential surface of the tubular main body is tapered so that the diameter of the internal opening of the body gradually increases from the tip thereof to the butt thereof, it is easier to arrange the shaft so that the portion of the shaft at and near the butt thereof is made light in weight.

In forming the reinforcing layers constituted by winding reinforcing sheets onto a main tube, it is preferable that risers of the sheets wound around the tube are covered with a fiber-reinforced resin protective layer lower in modulus of elasticity that the reinforcing layers so that the thick covering portions of the protective layer reinforce the body at the risers at which the main body would be most likely to be damaged. In this case, if a sheet made of a resin and glass fibers oriented in a direction and reinforcing the resin is used for forming the protective layer, then the sheet after being set is made transparent, through which layers of the main body can be viewed. Further, the protective layer may be subjected to polishing process to provide smooth outer surface without any risers projecting therefrom, thereby improve the outer appearance while sufficiently reinforcing the risers of the body.

In forming the reinforcing layers constituted by winding reinforcing sheets onto a main tube, it is preferable that the buttings of the side edges of the sheets are uniformly distributed along the circumference of the body so that the rigidity of the shaft main body is made circumferentially uniform.

What is claimed is:

1. A shaft for a golf club head, comprising:
a tubular main body made of a fiber-reinforced resin and including a tip, a butt opposite from the tip and an outside circumferential surface, the tip having an outside diameter equal to or less than 10 mm and the outside circumferential surface defining a substantially uniform diametrical progression, said tubular main body further including an inside circumferential surface defining an internal opening and a radial thickness from said inside surface to said outside surface, wherein said radial thickness of the tubular main body is gradually increased from the tip to the butt.

2. The shaft according to claim 1, wherein the outside circumferential surface is tapered from the butt to the tip at a ratio of 0/1,000 to 4/1,000 where the ratio is defined by a reduction of the diameter of the outside circumferential surface relative to said longitudinal length thereof.

3. The shaft according to claim 2, wherein the internal opening comprising a diameter which is gradually increased from the tip to the butt so that the inside circumferential surface is tapered at a smaller ratio than the outside circumferential surface.

4. The shaft according to claim 2, wherein the internal opening whose diameter which is gradually decreased from the tip to the butt.

5. The shaft according to claim 1, wherein the main tubular body further includes a main tube and a plurality of reinforcing layers pilingly provided on and around the main tube for gradually increasing rigidity of the main tube from the tip to the butt.

6. The shaft according to claim 5, wherein a first reinforcing layer is smaller in elasticity than an adjacent second reinforcing layer located radially outward from the first reinforcing layer with respect to the main tube.

7. The shaft according to claim 5, wherein the reinforcing layers have respective longitudinal lengths and a longitudinal length of a first reinforcing layer is longer than a longitudinal length of an adjacent second reinforcing layer located radially outward from the first reinforcing layer with respect to the main tube.

8. The shaft according to claim 7, wherein a longitudinal end of the second reinforcing layer defines a step portion on the first reinforcing layer, and the main body further includes a protective layer covering the step portion, the protective layer being lower in modulus of elasticity than the first reinforcing layer.

9. The shaft according to claim 8, wherein the protective layer defines an outer circumferential surface opposite from the first reinforcing layer, and a distance between the outer circumferential surface and the first reinforcing layer is gradually increased toward the second reinforcing layer.

10. The shaft according to claim 8, wherein the protective layer is formed of a reinforcing sheet wound over all the reinforcing layers.

11. The shaft according to claim 10, wherein the protective layer defines a step-less smooth outer circumferential surface which is a part of the outside circumferential surface.

12. The shaft according to claim 5, wherein the main tube is formed of a plurality of fiber-reinforced resin sheets pilingly wound so that both side edges of each of the resin sheets are located on corresponding ones of butting planes which are located at uniform angular intervals with respect to a longitudinal axis of the main body.

13. The shaft according to claim 12, wherein each of the fiber-reinforced resin sheets is wound by a plurality of turns so that a step portion is formed by one side edge and a portion of the resin sheet, and wherein the other side edge of the sheet is not overlapped with but butted to the step portion on the corresponding one of the butting planes.

14. The shaft according to claim 5, wherein the reinforcing layers are formed of fiber-reinforced resin sheets pilingly wound so that both side edges of each of the resin sheets are located on corresponding ones of butting planes which are located at uniform angular intervals with respect to a longitudinal axis of the main body.

15. The shaft according to claim 14, wherein each of the fiber-reinforced resin sheets is wound by one turn so that the side edges thereof are not overlapped with each other but butted to each other on the corresponding one of the butting planes.

16. The shaft according to claim 14, wherein each of the fiber-reinforced resin sheets has an oblique end connecting the side edges, said side edges having different lengths.

17. A shaft for a golf club, comprising:
a tubular main body made of fiber-reinforced resin and including:
a tip having an outside diameter equal to or less than 10 mm;
a butt opposite from the tip;
reinforcing layers pilingly provided one on another whose moduli of elasticity sequentially increase in the radial direction and toward the butt; and
an outside circumferential surface tapered from the butt to the tip at a ratio of 0/1,000 to 4/1,000 so as to define a substantially uniform diametrical progression where the ratio is defined by a reduction of the diameter of the outside circumferential surface relative to a longitudinal length.

18. A shaft for a golf club, comprising:
a main tube made of fiber-reinforced resin defining a tip end and a butt end opposite said tip end;
a plurality of reinforcing layers constituted by reinforcing sheets made of fiber-reinforced resin and pilingly provided around the main tube, wherein a longitudinal length of a first reinforcing layer is longer than a longitudinal length of an adjacent second reinforcing layer located radially outward from the first reinforcing layer with respect to the main tube; and
a protective layer made of a fiber-reinforced resin and covering a step portion defined by a longitudinal end of said second reinforcing layer provided on said first reinforcing layer, wherein the protective layer is lower in modulus of elasticity than the reinforcing layer.

19. A shaft for a golf club, comprising a main body reinforced by a plurality of fiber-reinforced resin sheets wound so that opposite side edges of each of said sheets are butted to each other, wherein the buttings of the side edges of the sheets are distributed around a circumference of said body at equal angular intervals.

20. The shaft according to claim 18, wherein the protective layer defines a radially outermost layer of said shaft.

21. The shaft according to claim 19, wherein said regular angular interval is 90 degrees.

* * * * *